(12) United States Patent
Most et al.

(10) Patent No.: US 10,084,807 B2
(45) Date of Patent: Sep. 25, 2018

(54) DETECTION OF BYPASS VULNERABILITIES

(71) Applicant: Microsoft Technology Licensing, LLC., Redmond, WA (US)

(72) Inventors: Yonatan Most, Kfar Saba (IL); Yinon Costica, Tel Aviv (IL)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 146 days.

(21) Appl. No.: 15/054,555

(22) Filed: Feb. 26, 2016

(65) Prior Publication Data
US 2017/0111383 A1   Apr. 20, 2017

Related U.S. Application Data

(60) Provisional application No. 62/242,628, filed on Oct. 16, 2015.

(51) Int. Cl.
*H04L 29/06* (2006.01)

(52) U.S. Cl.
CPC .......... *H04L 63/1433* (2013.01); *H04L 63/08* (2013.01); *H04L 63/083* (2013.01);
(Continued)

(58) Field of Classification Search
CPC ....... H04L 63/08; H04L 63/10; H04L 63/083; H04L 63/0815; H04L 63/1441; H04L 63/1433
See application file for complete search history.

(56) References Cited

U.S. PATENT DOCUMENTS

2009/0235345 A1 *   9/2009   Oikawa .................. G06F 21/31
                                                    726/7
2012/0255023 A1   10/2012   Maor et al.
(Continued)

FOREIGN PATENT DOCUMENTS

| CN | 104350467 A | 2/2015 |
|---|---|---|
| WO | 116745 A1 | 3/2001 |
| WO | 2013094847 A1 | 6/2013 |

OTHER PUBLICATIONS

Vissers, et al., "Maneuvering Around Clouds: Bypassing Cloud-based Security Providers", In Proceedings of the 22nd ACM SIGSAC Conference on Computer and Communications Security, Oct. 12, 2015, 12 pages.
(Continued)

*Primary Examiner* — Beemnet Dada
(74) *Attorney, Agent, or Firm* — M&B IP Analysts, LLC.

(57) ABSTRACT

A method and proxy device for detecting bypass vulnerabilities in a cloud-computing platform are provided. The method includes identifying an access attempt by a client device to a cloud-based application hosted in the cloud-computing platform; identifying login information corresponding to the identified access attempt; requesting authenticated login information from a central authentication system; correlating the login information corresponding to the access attempt with the authenticated login information; determining, based on the correlation, whether a bypass vulnerability exists; and generating a bypass event when it is determined that the bypass vulnerability has been exploited wherein the bypass event indicates that the access attempt to the cloud-based application has not been properly authenticated.

25 Claims, 4 Drawing Sheets

(52) U.S. Cl.
CPC .......... *H04L 63/0815* (2013.01); *H04L 63/10* (2013.01); *H04L 63/1441* (2013.01)

(56) References Cited

U.S. PATENT DOCUMENTS

| | | |
|---|---|---|
| 2014/0208426 A1 | 7/2014 | Natarajan et al. |
| 2015/0082399 A1 | 3/2015 | Wu et al. |
| 2015/0134619 A1 | 5/2015 | Factor et al. |
| 2015/0163224 A1 | 6/2015 | Kim et al. |
| 2015/0222604 A1 | 8/2015 | Ylonen |

OTHER PUBLICATIONS

"Secure Cloud Interconnect", Retrieved on: Nov. 20, 2015, Available at: http://www.verizonenterprise.com/products/networking/secure-cloud-interconnect/.

"Bypassing Certificate Verification", Published on: Sep. 16, 2014, Available at: http://www.websense.com/content/support/library/web/hosted/admin_guide/wd_bypass_certif_verif.aspx.

Chaudhry Saif, "Best Security Practices for Microsoft Azure: Locking Down Your Environment", Published on: Apr. 29, 2015, Available at: http://blog.trendmicro.com/best-security-practices-for-microsoft-azure-locking-down-your-environment-3/.

Modi, et al., "A Survey on Security Issues and Solutions at Different Layers of Cloud Computing", In Journal of Supercomputing vol. 63, Issue 2, Feb. 2013, pp. 561-592.

Li, et al., "CyberGuarder: A Virtualization Security Assurance Architecture for Green Cloud Computing", In Future Generation Computer Systems, vol. 28, Issue 2, Feb. 2012, pp. 379-390.

Behl, Akhil, "Emerging Security Challenges in Cloud Computing: An Insight to Cloud Security Challenges and Their Mitigation", In Proceedings of World Congress on Information and Communication Technologies, Dec. 11, 2011, pp. 217-222.

"AWS Cloud Security", Published on: Aug. 6, 2015, Available at: https://aws.amazon.com/security/.

Zhang, et al., "Securing Elastic Applications on Mobile Devices for Cloud Computing", In Proceedings of the ACM workshop on Cloud computing security, Nov. 13, 2009, pp. 127-134.

"International Search Report and Written Opinion Issued in PCT Application No. PCT/US2016/056253", dated Jan. 17, 2017, 12 Pages.

\* cited by examiner

DETECTION OF BYPASS VULNERABILITIES

CROSS-REFERENCE TO RELATED APPLICATIONS

This application claims the benefit of U.S. Provisional Application No. 62/242,628 filed on Oct. 16, 2015, the contents of which are hereby incorporated by reference.

BACKGROUND

In recent years, an increasing number of providers have begun offering the ability to create computing environments in the cloud. For example, in 2006, Amazon Web Services™ (also known as AWS) launched a service that provides users with the ability to configure an entire environment tailored to an application executed over a cloud platform. In general, such services allow for developing scalable applications in which computing resources are utilized to support efficient execution of the applications.

Organizations and businesses that develop, provide, or otherwise maintain applications have become accustomed to relying on these services and implementing various types of environments, from complex websites to applications and services provided as software-as-service (SaaS) delivery models. Such services and applications are collectively referred to as "cloud-based applications."

Cloud-based applications are typically accessed by users using a client device via a web browser. Cloud-based applications include, among other things, e-commerce applications, social media applications, enterprise applications, gaming applications, media sharing applications, storage applications, software development applications, and so on. Many individual users, businesses, and enterprises turn to cloud applications in lieu of "traditional" software applications that are locally installed and managed. For example, an enterprise can use Office® 365 online services for email accounts, rather than having an Exchange® Server maintained by the enterprise.

As greater reliance is made on cloud-based applications, securing access to such cloud applications becomes increasingly important. For example, for an e-commerce application executed in a cloud-computing platform, any unauthorized access and/or data breach must be prevented to ensure protection of sensitive customer and business information such as, e.g., credit card numbers, names, addresses, and so on.

Providers of cloud computing platforms offer various security tools (e.g., systems, services, and functions) primary designed to protect their infrastructure against cyber-attacks or threats. A prime example for such a security tool is an authentication of any user accessing a cloud-based application. A basic authentication process would require a user attempting to access a cloud-based application to provide correct credentials in order to gain access. Examples for such credentials include a username, a password, biometrics, a secured token or key, an authentication code received through a secondary channel, any combination thereof, or any other type of credentials utilized during a login in or sign-on process.

An authentication process to one or more cloud-based applications is typically controlled by a federated identity management (FIdM) system, a single-sign-on (SSO) server, and the like. A FIdM system provides means for linking a person's electronic identity and attributes, stored across multiple distinct identity management systems. A SSO server typically ensures that when a user logs in to one application, the user will be signed in to every other application controlled by the SSO server, regardless of the platform, technology and domain. SSO servers and FIdM systems deployed in a cloud-computing platform typically implement policies and protocols to manage the identity of users and devices across organizations and prevent misuse of credentials by unauthorized users (e.g., hackers) or malicious software (e.g., bots).

To gain unauthorized access to a cloud-based application, an attempt would be made to bypass any FIdM system or SSO server deployed in the cloud computing platform or organization. Such an attempt is known a bypass vulnerability. That is, a bypass vulnerability exists or occurs when a user is able to access a cloud-based application while bypassing authentication means (e.g., a SSO server or FIdM system) deployed in the cloud-computing platform.

Exploitation of bypass vulnerabilities may result in unauthorized users gaining unrestricted access to sensitive information or in authorized users accessing sensitive information via unsecured or otherwise unauthorized channels. Further, unauthorized users that bypass the SSO are not subject to security policies enforced by the SSO.

Bypass vulnerabilities may be exploited by, e.g., altering fixed parameters, obscuring restricted uniform resource locators, injecting structured query language (SQL) that alters security functions, and so on. Alternatively, a bypass vulnerability may be exploited unintentionally due to, e.g., a mistake in the configuration of the cloud computing platform. The bypass vulnerability exploits frequently proceed unnoticed until well after the bypassing entities have had the opportunity to cause significant damage. As a result, it is difficult to determine the culprit(s) of the breach.

Therefore, it would be advantageous to provide an efficient solution for detecting bypass vulnerabilities with respect to cloud-based applications.

SUMMARY

This Summary is provided to introduce a selection of concepts in a simplified form that are further described below in the Detailed Description. This Summary is not intended to identify key features or essential features of the claimed embodiments, nor is it intended to be used to limit the scope of the various claimed embodiments. Moreover, sole purpose of this Summary is to present some concepts of one or more embodiments in a simplified form as a prelude to the more detailed description that is presented later. For convenience, the term "some embodiments" or "various embodiments" may be used herein to refer to a single embodiment or multiple embodiments of the disclosure.

Various embodiments disclosed herein include a method for detecting bypass vulnerabilities in a cloud-computing platform. The method includes identifying an access attempt by a client device to a cloud-based application hosted in the cloud-computing platform; identifying login information corresponding to the identified access attempt; requesting authenticated login information from a central authentication system; correlating the login information corresponding to the access attempt with the authenticated login information; determining, based on the correlation, whether a bypass vulnerability exists; and generating a bypass event when it is determined that the bypass vulnerability has been exploited wherein the bypass event indicates that the access attempt to the cloud-based application has not been properly authenticated.

Various embodiments disclosed herein also include a proxy device for detecting bypass vulnerabilities in a cloud-computing platform. The proxy device comprises a processing system; and a memory, the memory containing instructions that, when executed by the processor, configure the proxy device to: identify an access attempt by a client device to a cloud-based application hosted in the cloud-computing platform; identify login information corresponding to the identified access attempt; request authenticated login information from a central authentication system; correlate the login information corresponding to the access attempt with the authenticated login information; determine, based on the correlation, whether a bypass vulnerability exists; and generate a bypass event when it is determined that the bypass vulnerability has been exploited, wherein the bypass event indicates that the access attempt to the cloud-based application has not been properly authenticated.

Various embodiments disclosed herein further include cloud computing platform that comprises at least one server configured to host at least one cloud-based application; and a proxy device communicatively connected to the at least one server. The proxy device includes a processing system; and a memory, the memory containing instructions that, when executed by the processing system, configure the device to detect cyber threats against a cloud-based application, wherein the proxy device is further configured to: identify an access attempt by a client device to a cloud-based application hosted in the cloud-computing platform; identify login information corresponding to the identified access attempt; request authenticated login information from a central authentication system; correlate the login information corresponding to the identified access attempt with the authenticated login information; determine, based on the correlation, whether a bypass vulnerability exits; and generate a bypass event when it is determined that the bypass vulnerability has been exploited, wherein the bypass event indicates that the access attempt to the cloud-based application has not been properly authenticated.

BRIEF DESCRIPTION OF THE DRAWINGS

The subject matter disclosed herein is particularly pointed out and distinctly claimed in the claims at the conclusion of the specification. The foregoing and other objects, features and advantages of the disclosed embodiments will be apparent from the following detailed description taken in conjunction with the accompanying drawings.

DETAILED DESCRIPTION

Figure 1:
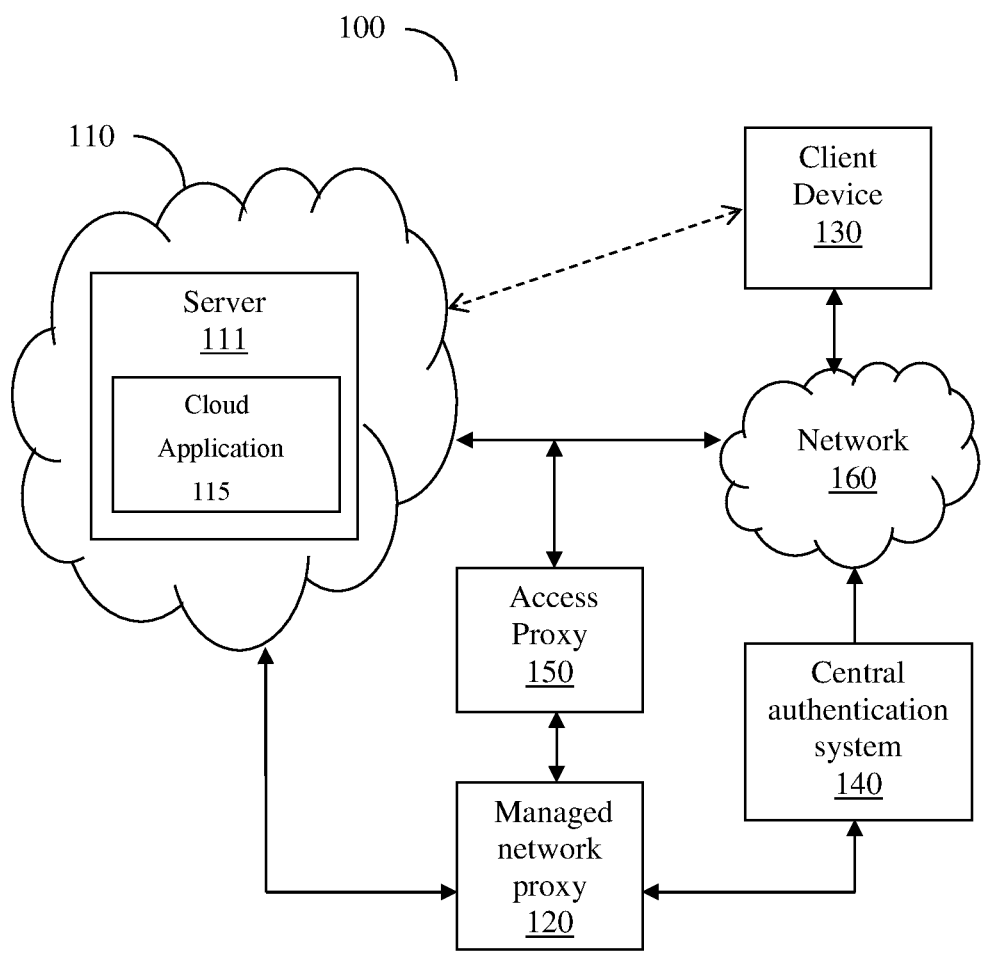
FIG. 1 is a schematic diagram of a networked system utilized to describe the disclosed embodiments.

It is important to note that the embodiments disclosed herein are only examples of the many advantageous uses of the innovative teachings herein. In general, statements made in the specification of the present application do not necessarily limit any of the various claims. Moreover, some statements may apply to some inventive features but not to others. In general, unless otherwise indicated, singular elements may be in plural and vice versa with no loss of generality. In the drawings, like numerals refer to like parts through several views.

Techniques for detecting bypass vulnerabilities in a cloud computing platform are disclosed herein. The techniques can be implemented by a managed network proxy or any other computing device communicatively connected to the cloud computing platform. Typically, authentication to cloud-based applications hosted in a cloud computing platform is controlled and enforced by a central authentication system (e.g., a SSO server or a FIdM system) and/or by an access proxy. Bypassing any of these elements would trigger a bypass event.

With the aim of detecting bypass vulnerabilities, in an embodiment, the login information provided by the cloud-based application or the access proxy is correlated with authenticated login information provided by a central authentication system. If the pieces of information do not correlate, a bypass vulnerability may be detected. The detected vulnerability indicates that a client device is accessing the cloud-based application without being authenticated either by the access proxy or by the central communication system.

FIG. 1 is an example diagram of a network system 100 utilized to describe the various disclosed embodiments. The network system 100 includes a cloud computing platform 110 which may be a private cloud, a public cloud, or a hybrid cloud providing cloud computing resources to applications or services executed therein. In an embodiment, the cloud computing platform 110 may be a software-as-a-service (SaaS) platform.

The cloud computing platform 110 includes at least one server 111 configured to execute a cloud-based application 115. The cloud-based application 115 may be an e-commerce application, a social media application, an enterprise application, a gaming application, a media sharing application, a storage application, a software development application, and so on.

The network system 100 further includes a managed network proxy 120, a client device 130, and a central authentication system 140 that are communicatively connected to a network 160. In certain embodiments, an access proxy 150 is also communicatively connected to the network 160. In some configurations, the managed network proxy 120 and the access proxy 150 may be separate proxies, or may be combined into a single proxy (not shown) without departing from the disclosed embodiments. It should be noted that only one client device 130 and on server 111 executed the cloud-based application 115 are shown in FIG. 1 merely for the sake of simplicity and should not limit the scope of the various disclosed embodiments.

The network 160 may be, for example, a wide area network (WAN), a local area network (LAN), the Internet, and the like. The client device 130 may be a personal computer, a laptop, a tablet computer, a smartphone, a wearable computing device, or any other computing device. The client device 130 may be a managed or unmanaged device. It should be noted that one client device 130 is illustrated merely for simplicity purposes and without limitation on any of the disclosed embodiments. A managed client device is typically secured by an IT personnel of an organization, while an unmanaged client device is not. Referring to the above example, a work computer is a managed device while the home computer is an unmanaged device.

The central authentication system 140 is configured to link a user's electronic identity across multiple distinct identity management systems. Alternatively or collectively, the central authentication system 140 can be configured to allow a user of the client device 130 to log in once and gain access to systems and/or applications of an enterprise without being prompted to log in again at each subsequent access of such systems and/or applications. The central authentication system 140 can be realized as any type of a FIdM system, a SSO server, and the like.

The central authentication system 140 typically can utilize lightweight directory access protocol (LDAP) databases, persistent cookies, and authentication and provisioning protocols. Examples for authentication and provisioning protocols include, for example, WS-Federation®, security assertion markup language (SAML), WS-TRUST, IdP provisioning, and the like.

In an embodiment, a request to access the cloud-based application 115 sent from the client device 130 is forwarded from the access proxy 150 to the central authentication system 140. The central authentication system 140 is configured to authenticate the request and to return an authentication token if authenticated. The access proxy 150 is configured to allow or block access to the cloud-based application 115 (or any of its components and/or resources) based on the feedback received from the central authentication system 140. As will be discussed in detail below, the access proxy 150 is also configured to block the client device 130 from accessing any cloud-based application 115 upon receiving a notification that a bypass event is detected. Such a notification is triggered by the managed network proxy 120.

It should be noted that the access proxy 150 may provide a full access, a limited access, or may block an access to any cloud-based application 115 hosted in the cloud-computing platform 110. A limited access would allow a user of the client device 130 to provide limited actions or access certain components and/or resources of the cloud-based application 115. For example, a user may be permitted to view a document but not to locally save a document. In an embodiment, the type of access to grant is determined based on one or more access profile set in the access proxy 150. The access proxy 150 is configured to support any token-based authentication protocols, examples for which are provided above.

According to the disclosed embodiments, the managed network proxy 120 is configured to detect bypass vulnerabilities. A bypass vulnerability exists may be detected when the client device 130 accesses a cloud-based application 115 while bypassing the central authentication system 140 and/or the access proxy 150. A client device 130 may be operated by a user (human) or a bot. Upon detection of a bypass vulnerability, a bypass event is triggered and sent to the access proxy 150 and/or to the accessed cloud-based application 115.

Trigging of a bypass event may cause initiation of a mitigation action. Such a mitigation action may include, for example, blocking any access attempt to the cloud-based application 115 by the client device 130, blocking future access attempts from an IP address of the client device 130, terminating an active session with the device 130, reporting the client device 130 to reputation services, and so on. An access attempt is any action that could result in accessing information in the cloud application 115 and may be a login to an application, viewing a document, uploading a file, downloading a file, and so on.

A bypass vulnerability is detected, and a respective event is triggered, based on the correlation of access attempt information as provided by the cloud-based application 115 (hereinafter "login information") with access information as received or recorded by the central authentication system 140 (hereinafter "authenticated login information"). Any of the login information or the authenticated login information may include, for example, a username, a password, a time stamp, and so on. The login information may further include application-layer parameters such as a URL, a type of client device 130, a browser type of the device 130, and so on.

In an embodiment, a first type of bypass vulnerability that can be detected is when the client device 130 directly accesses (logs in) the cloud-based application 115. To detect such vulnerability, the managed network proxy 120 is configured to compare the login information to authenticated login information. If the comparison results in a mismatch and/or the authenticated login information is not available, a bypass event is triggered.

As a non-limiting example, an access made directly to the cloud-based application 115 is identified by the managed network proxy 120. The identification may be based on login information received from the cloud-based application 115 responsive to such an access attempt. The login information includes providing a username to the cloud application 115. The managed network proxy 120 is configured to compare the username of the access attempt to usernames provided to the central authentication system 140. It is determined that the username given during the direct access does not match any of the usernames received by the central authentication system 140. The managed network proxy 120 triggers a bypass event respective thereof.

In one embodiment, the bypass event is triggered when there is a direct access attempt to the cloud-based application 115 and the subsequent access to the central authentication system 140 does not occur within a timeout period beginning at the time of the direct access. The timeout period is a configurable parameter. For example, the timeout period may be set to 10 seconds.

In another embodiment, a second type of bypass vulnerability can be detected when the client device 130 gains an access to the cloud-based application 115 directly via the central authentication system 140. To detect such vulnerability, the managed network proxy 120 is configured to determine if the authenticated login information (provided by central authentication system 140) match a respective access request provided by the access proxy 150. In a legitimate access attempt, the access request would be provided by the access proxy 150. If the comparison results in a mismatch, the access request is not available at the proxy 150, and/or the access request is received after timeout period, a bypass event is triggered.

It should be understood that the embodiments disclosed herein are not limited to the specific architecture illustrated in FIG. 1 and other architectures may be used without departing from the scope of the disclosed embodiments. Specifically, the managed network proxy 120 may reside in the cloud computing platform 110, a different cloud computing platform, a device also including the access proxy 150, or a datacenter connectable to a cloud computing platform. Moreover, in an embodiment, there may be a plurality of managed proxies 120 operating as described hereinabove and configured to either have one as a standby proxy to take control in the event of a failure, to share loads between them, or to split the functions between them.

The managed network proxy 120 is shown as an example implementation. In an embodiment, the managed network proxy 120 may be deployed in the network in other configurations and still provide the disclosed embodiments. In an embodiment, the managed network proxy 120 includes a processing system coupled to a memory. An example block diagram of the managed network proxy 120 is discussed with reference to FIG. 4.

It should be further noted that FIG. 1 is described herein above with respect to a cloud-computing platform 110 including one server 111 configured to execute one cloud-based application 115 merely for simplicity purposes and without limitation on the disclosed embodiments. Multiple servers and/or multiple cloud-based applications may be utilized without departing from the scope of the disclosure.

The disclosed embodiments for detecting bypass events can be performed by other types of security systems that are communicatively connected to the cloud computing platform 110 and to the central authentication system 140. The information with respect to access attempts and any information required to detect bypass events can be retrieved from the central authentication system 140 and/or the cloud computing platform 110 through an application program interface (API). Further, any bypass events can be reported to external systems (not shown), such as reputation system through an API. Data provided directly through the APIs may include logs of access requests made by the client, the authenticated login information, login information, and so on.

Figure 2:
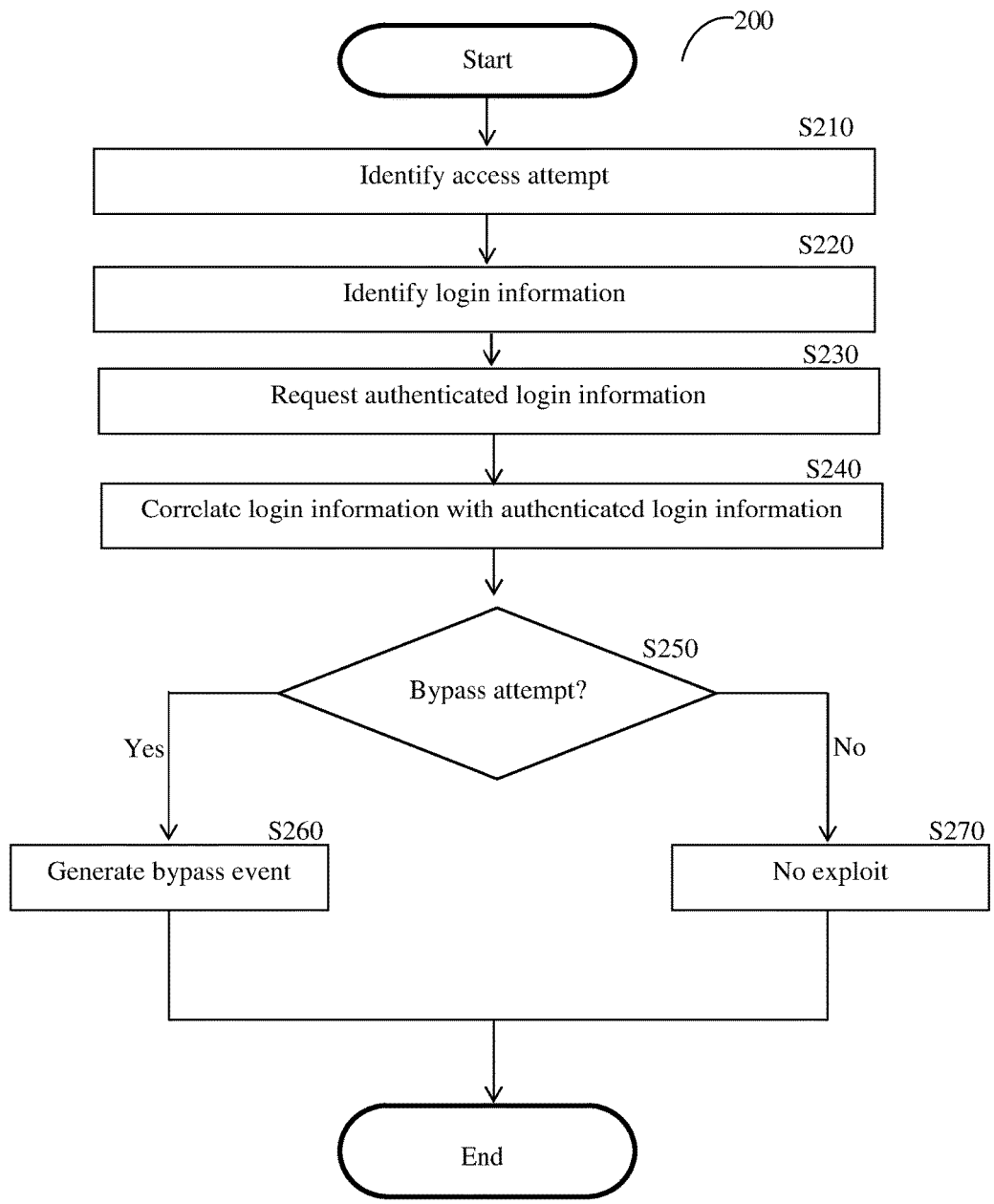
FIG. 2 is a flowchart illustrating a method for detecting a bypass vulnerability according to one embodiment to one embodiment.

FIG. 2 depicts an example flowchart 200 illustrating a method for detecting a bypass vulnerability according to one embodiment. In this embodiment, an access attempt to a cloud-based application bypassing a central authentication system is detected.

At S210, an access attempt to a cloud-based application (e.g., the cloud-based application 115, FIG. 1) is identified. At S220, login information provided during the access attempt is identified. The login information includes at least one attribute related to a user, the client device attempting to access the cloud-based application, and/or a request associated with the access attempt. Examples for attributes that may be included in the login information are a username, a password, a timestamp of the access attempt, application-layer parameters, and so on.

At S230, authenticated login information is requested from a central authentication system (e.g., the system 140, FIG. 1). In a one embodiment, authenticated login information is requested respective of the at least one attribute identified in the access attempt. Alternatively or collectively, the authenticated login information recorded during a past predefined time period may be requested (e.g., all log-ins recorded by the authentication system during the last 5 minutes).

At S240, the requested login information (gathered from the cloud-based application) is correlated with authenticated login information received by the central authentication system. In an embodiment, the correlation is performed by comparing the login information to the authenticated login information. The comparison may include determining whether the login information matches any portion of the authenticated login information.

In a non-limiting embodiment, a predefined set of attributes in the login information should match a respective set of attributes in the authenticated login information to determine a match. For example, the set of attributes may include a username (USER-A) and password (PASS-XYZ). If the authenticated login information includes the values of USER-A and PASS-XYZ, then there is a match.

The set of attributes may include a timestamp that can be compared to the authenticated login information with a certain tolerance (respective of the timeout period). For example, the set of attributes may include a username (USER-A), a password (PASS-XYZ), a timestamp (22:05:00), and the timeout period set to 30 seconds. If the authenticated login information includes a timestamp of 22:05:27 and the values of USER-A and PASS-XYZ, then there is a match. In yet another example, if the returned authenticated login information is void, then there is no match.

In an embodiment, the set of attributes selected for the comparison may include a subset of mandatory attributes and a subset of optional attributes. In a further embodiment, the subset of mandatory attributes (e.g., username and timestamp) must match the respective attributes in the authenticated login information to determine a match.

In one embodiment, the matching mandatory attributes and/or optional attributes can be utilized to determine a confidence level for a potential bypass event. As an example, the optional attributes may include a geographical location of a client device while the mandatory attributes may include a username, password, and timestamp. If all attributes are matched, the confidence level is set to low; if only mandatory attributes are matched, the confidence level is set to medium; and if none of attributes are matched, then confidence level is set to high. The confidence level indicates a probability of a bypass event. In an embodiment, consideration of the confidence level as part of the decision of whether to trigger a bypass event reduces the false positive rate.

At S250, based on the comparison, it is determined whether a bypass vulnerability exists. If so, execution continues with S260; otherwise, execution continues with S270. In an embodiment, a bypass vulnerability occurs if a match was not determined at S240. In another embodiment, a bypass vulnerability occurs if the confidence level is above a predefined level (e.g., high confidence level indicates a potential vulnerability).

At S260, upon determining that the access to the cloud-based application bypasses the central authentication system, a bypass event is generated. The bypass event indicates that the access was not secured and, therefore, may be unauthorized. In an embodiment, S260 may further include performing a mitigation action to remedy the detected vulnerability. Examples for mitigation actions that can be performed are discussed above.

In an embodiment, if a bypass event is generated, it may be further determined whether the access is fraudulent. To determine whether the access is fraudulent, a risk score may be computed using a decision tree. The risk score may be used to determine whether the bypass event is a false positive. A false positive occurs when the access was not fraudulent despite the detection of the bypass event. As a non-limiting example, an access by a user who is authorized to utilize one or more backdoors to directly access a cloud application may yield a false positive.

At S270, upon determining that the access attempt does not bypass the central authentication system, it is determined that a bypass vulnerability has not been exploited. In an embodiment, S270 may further include sending a message to an owner of the cloud-based application indicating that the access did not involve bypassing the central authentication system.

In some embodiments, only a limited access to the cloud-based application may be provided. A policy for determining whether a full or limited access should be provided may be based, for example, on the confidence level. For instance, a limited access will be authorized when the confidence level is medium.

Figure 3:
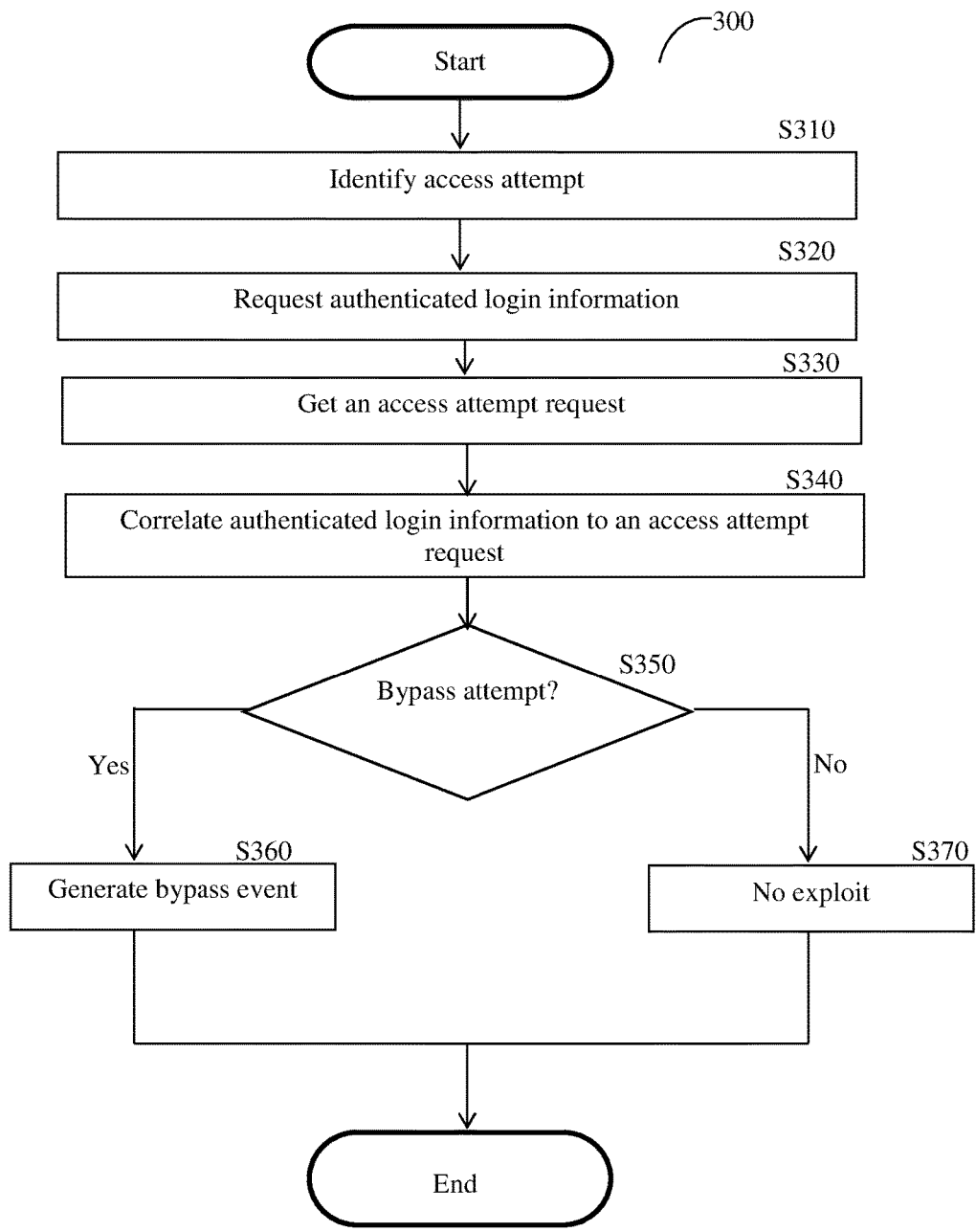
FIG. 3 is a flowchart illustrating a method for detecting a bypass vulnerability according to one embodiment to another embodiment.

FIG. 3 depicts an example flowchart 300 illustrating a method for detecting a bypass vulnerability according to another embodiment. In this embodiment, an access attempt to the cloud-based application bypassing an access proxy is detected.

At S310, an access to a cloud-based application (e.g., the cloud-based application 115, FIG. 1) is identified. In an embodiment, such information is received directly from the cloud-based application via an API.

At S320, authenticated login information is requested from a central authentication system (e.g., the system 140, FIG. 1). In one embodiment, authenticated login information is requested respective of at least one attribute identified in the access attempt. Alternatively or collectively, the authenticated login information recorded during a past predefined time period may be requested (e.g., all log-ins recorded by the authentication system during the last 5 minutes). In an embodiment, the central authentication system is accessed through an API and logs including the authenticated login information are retrieved.

At S330, an access attempt request corresponding to the identified access attempt is requested from the access proxy (e.g., the access proxy 150, FIG. 1). As noted above, in an optional deployment, the access proxy enforces security policies set for the cloud-based application. In a legitimate authentication transaction, an access attempt request is forwarded from the access proxy to the central authentication system.

At S340, the access attempt request is correlated with the authenticated login information received by the central authentication system. In an embodiment, the correction is performed by comparing the one or more attributes in the access attempt request to the login information to the authenticated login information. Various embodiments for performing the comparisons and correlation are discussed above. As further discussed above, a confidence level can be generated respective of the comparison's results.

At S350, based on the correlation, it is determined whether a bypass vulnerability exists. If so, execution continues with S360; otherwise, execution continues with S370. In an embodiment, a bypass vulnerability exists when the access request attempt does not correlate with the authenticated login information (i.e., a match was not determined) and/or no access attempt request is provided by the access proxy. In another embodiment, a bypass vulnerability exists when the confidence level is above a predefined level (e.g., high confidence level indicates a potential vulnerability).

At S360, upon determining that the access bypasses the access proxy, a bypass event is generated. The bypass event indicates that the access was not secured and, therefore, may be unauthorized by the access proxy. In an embodiment, S360 may further include performing a mitigation action to mitigate the detected vulnerability. Examples for mitigation actions that can be performed are discussed above.

In an embodiment, when a bypass event is generated, it may be further determined whether the access is fraudulent. To determine whether the access is fraudulent, a risk score may be computed using a decision tree.

At S370, upon determining that the access attempt does not bypass the central authentication system, it is determined that a bypass vulnerability has not been exploited. In an embodiment, S370 may further include sending a message to an owner of the cloud-based application indicating that the access did not involve bypassing the central authentication system.

In some embodiments, only a limited access to the cloud-based application may be provided. A policy for determining whether a full or limited access should be provided may be based, for example, on the confidence level. For instance, a limited access will be authorized when the confidence level is medium.

The methods for detecting bypass vulnerabilities as discussed herein above with respect to FIGS. 2 and 3 can be performed by the managed network proxy (e.g., the proxy 120, FIG. 1). In a further embodiment, the managed network proxy can be configured to detect the various types of bypass vulnerabilities simultaneously. Alternatively, a security policy can be set to determine which types of bypass vulnerabilities (one, some or all) should be detected, based on the type of the cloud-based application, time, geographical location, or any other provisioning set by an owner of the cloud-based application or the cloud computing platform.

Figure 4:
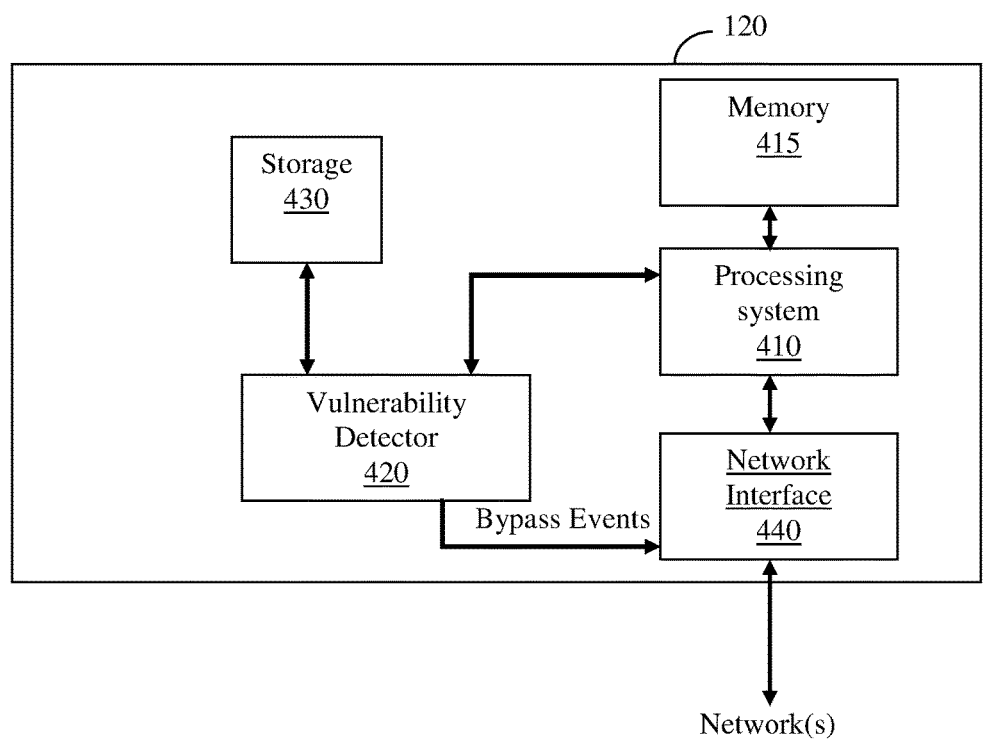
FIG. 4 is a block diagram of a managed network proxy according to an embodiment.

FIG. 4 shows an example block diagram of the managed network proxy 120 constructed according to an embodiment. The managed network proxy 120 may be deployed in cloud-computing platforms, data centers, or as a stand-alone network device. The managed network proxy 120 is configured to at least control and enforce access to cloud applications based on access policies as described in greater detail above with respect to FIGS. 1-3.

The managed network proxy 120 includes a processing system 410 coupled to a memory 415, an application-level vulnerability detector 420, and a storage 430, and a network interface 440. The memory 415 contains instructions that, when executed by the processing system 410, configure the managed network proxy 120 to perform the embodiments described herein.

The processing system 410 may be realized by one or more hardware logic components and circuits. For example, and without limitation, illustrative types of hardware logic components that can be used include Field Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), general-purpose microprocessors, microcontrollers, digital signal processors (DSPs), and the like, or any other hardware logic components that can perform calculations or other manipulations of information. The memory 115 may be volatile (e.g., RAM, etc.), non-volatile (e.g., ROM, flash memory, etc.), or a combination thereof.

The storage 430 may be magnetic storage, optical storage, and the like and may be realized, for example, as flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information.

In one configuration, computer readable instructions to implement one or more embodiments disclosed herein may be stored in the storage 430. The storage 430 may also store other computer readable instructions to implement an operating system, an application program, and the like. Computer readable instructions may be loaded in the memory 415 for execution by the processing system 410. The storage 430 is configured to store, for example, information about generated bypass events, login information, authenticated login information, information about malicious users, and so on.

In another embodiment, the storage 430 and/or memory 415 are configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system 410 to perform the various functions described herein.

The network interface 440 allows the proxy 120 to communicate with other external devices. For example, the interface 440 allows the proxy 120 to communicate the central authentication server, the cloud computing platform, and the authentication proxy over a network. In an embodiment, the network interface 440 is with a user device allowing a user (e.g., a system administrator) to remotely access the proxy 120 for the purpose of, for example, configuration, reporting, etc. Such connection, in an embodiment, can be realized through a web portal. The network interface 440 may include a wired connection or a wireless connection. The network interface 440 may transmit and/or receive communication media. For example, the network interface 440 may include a modem, a network interface card (NIC), an integrated network interface, a radio frequency transmitter/receiver, an infrared port, a USB connection, and the like.

The vulnerability detector 420 is configured to detect bypass vulnerabilities. One type of vulnerability is when a client device directly accesses a cloud-based application while bypassing a central authentication system (e.g., the system 140). Another type of vulnerability is when a client device accesses a cloud-based application a central authentication system while bypassing an access proxy. The operation of the vulnerability detector 420 is discussed in greater detail with reference to FIGS. 2 and 3.

In an embodiment, the vulnerability detector 420 is further configured to determine if the detected bypass vulnerability is a false positive (i.e., that the bypassing access is nevertheless authorized) based on a determined risk score.

In another embodiment, upon detecting a bypass vulnerability, the vulnerability detector 420 is further configured to generate an alert indicating the potentially unauthorized access and/or to cause execution of mitigation actions. The generated alert may be sent to, e.g., the cloud application, the central authentication system, and so on. In a further embodiment, the alert may be provided in real-time in response to the bypassing access.

In an embodiment, the vulnerability detector 420 can be realized by one or more hardware logic components and circuits. For example, and without limitation, illustrative types of hardware logic components that can be used include FPGAs, ASICs, ASSPs, SOCs, CPLDs, general-purpose microprocessors, DSPs, and the like, or any other hardware logic components that can perform calculations or other manipulations of information.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended to aid the reader in understanding the disclosed embodiments and the concepts contributed by the inventor to furthering the art, and are to be construed as being without limitation to such specifically recited examples and conditions. Moreover, all statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for detecting authentication bypass vulnerabilities in a cloud-computing platform, comprising:
   identifying an access attempt by a client device to a cloud-based application hosted in the cloud-computing platform;
   receiving, from an access proxy, login information corresponding to the identified access attempt, wherein the access proxy is connected between the client device and the cloud computing platform;
   requesting authenticated login information from a central authentication system;
   correlating the received login information corresponding to the access attempt with the requested authenticated login information provided by the central authentication system;
   determining, based on the correlation, whether an authentication bypass vulnerability exists, wherein the authentication bypass vulnerability exists when the received login information is uncorrelated with the requested authenticated login information; and
   generating a bypass event when it is determined that the authentication bypass vulnerability exists, wherein the bypass event indicates that the access attempt to the cloud-based application has not been properly authenticated.

2. The method of claim 1, further comprising:
   upon generating the bypass event, causing execution of at least one mitigation action to secure the cloud-based application.

3. The method of claim 1, wherein the central authentication system is any of: a federated identity management (FIdM) system and a single-sign-on (SSO) server.

4. The method of claim 1, wherein each of the login information corresponding to the access attempt and the authenticated login information includes a set of attributes identifying at least one of: a user of the client device, the client device, and a request associated with the access attempt.

5. The method of claim 4, wherein the set of attributes includes at least one of: a username, a password, login credentials, a current timestamp, and application-layer parameters.

6. The method of claim 4, wherein correlating the login information with the authenticated login information further comprises:
   comparing a set of attributes identified in the login information corresponding to the access attempt to a respective set of attributes identified in the authenticated login information; and
determining the login information as correlated to the authenticated login information, when the sets of attributes match.

7. The method of claim 6, wherein the bypass vulnerability exists when the login information corresponding to the access attempt does not correlate to the authenticated login information.

8. The method of claim 6, further comprising:
computing a confidence level based on the comparison of the set of attributes; and
associating the generated bypass event with the confidence level.

9. The method of claim 8, further comprising:
selecting an access level from different access levels to be granted for the client device based on at least one of the confidence level and the bypass event, wherein the access level is any one of: full access, limited access, and no access.

10. The method of claim 1, further comprising:
requesting the login information corresponding to the identified access attempt from the cloud-based application; and
determining that the client device bypasses authentication performed by the central authentication system when the bypass vulnerability exists.

11. The method of claim 1, wherein the login information is derived from logs directly retrieved through a first API of the cloud-based application and the authenticated login information is derived from logs directly retrieved through a second API of the central authentication system.

12. A non-transitory computer readable medium having stored thereon instructions for causing one or more processing units to execute a process for detecting authentication bypass vulnerabilities in a cloud-computing platform, the process comprising:
identifying an access attempt by a client device to a cloud-based application hosted in the cloud-computing platform;
receiving, from an access proxy, login information corresponding to the identified access attempt, wherein the access proxy is connected between the client device and the cloud computing platform;
requesting authenticated login information from a central authentication system;
correlating the received login information corresponding to the access attempt with the requested authenticated login information provided by the central authentication system;
determining, based on the correlation, whether an authentication bypass vulnerability exists, wherein the authentication bypass vulnerability exists when the received login information is uncorrelated with the requested authenticated login information; and
generating a bypass event when it is determined that the authentication bypass vulnerability exists, wherein the bypass event indicates that the access attempt to the cloud-based application has not been properly authenticated.

13. A proxy device for detecting authentication bypass vulnerabilities in a cloud-computing platform, the proxy device is connected between the client device and the cloud computing platform, the proxy device comprising:
a processing system; and
a memory, the memory containing instructions that, when executed by the processor, configure the proxy device to:
receive an access attempt by a client device to a cloud-based application hosted in the cloud-computing platform;
identify login information corresponding to the identified access attempt;
request authenticated login information from a central authentication system;
correlate the received login information corresponding to the access attempt with the requested authenticated login information provided by the central authentication system;
determine, based on the correlation, whether an authentication bypass vulnerability exists, wherein the authentication bypass vulnerability exists when the received login information is uncorrelated with the requested authenticated login information; and
generate a bypass event when it is determined that the bypass vulnerability exists, wherein the bypass event indicates that the access attempt to the cloud-based application has not been properly authenticated.

14. The proxy device of claim 13, wherein the proxy device is further configured to:
cause execution of at least one mitigation action to secure the cloud-based application, upon generating the bypass event.

15. The proxy device of claim 13, wherein the central authentication system is any of: a federated identity management (FIdM) system and a single-sign-on (SSO) server.

16. The proxy device of claim 13, wherein each of the login information and the authenticated login information includes a set of attributes identifying at least one of: a user of the client device, the client device, and a request associated with the access attempt.

17. The proxy device of claim 16, wherein the set of attributes includes at least one of: a username, a password, login credentials, a current timestamp, and application-layer parameters.

18. The proxy device of claim 16, wherein the proxy server is further configured to:
compare a set of attributes identified in the login information corresponding to the access attempt to a respective set of attributes identified in the authenticated login information; and
determine the login information associated with the access attempt as correlated to the authenticated login information, when the sets of attributes match.

19. The proxy device of claim 18, wherein the bypass vulnerability occurs when the login information corresponding to the access attempt does not correlate to the authenticated login information.

20. The proxy device of claim 18, wherein the proxy server is further configured to:
compute a confidence level based on the comparison of the set of attributes; and
associate the generated bypass event with the confidence level.

21. The proxy device of claim 13, wherein the proxy server is further configured to:
select an access level from different access levels to be granted for the client device based on at least one of the confidence level and the bypass event, wherein the access level is any one of: full access, limited access, and no access.

22. The proxy device of claim 13, wherein the proxy server is further configured to:
request the login information corresponding to the access attempt from an access proxy, wherein the access proxy is communicatively connected to the client device and the cloud computing platform; and determine that the client has bypassed authentication performed by the access proxy, when the bypass vulnerability occurs.

23. The proxy device of claim 13, wherein the login information is derived from logs directly retrieved through a first API of the cloud-based application and the authenticated login information is derived from logs directly retrieved through a second API of the central authentication system.

24. A cloud computing platform, comprising:
at least one server configured to host at least one cloud-based application; and
a proxy device connected to the at least one server, wherein the proxy device includes a processing system and a memory; the memory containing instructions that, when executed by the processing system, configure the proxy device to detect cyber threats against a cloud-based application, wherein the proxy device is further configured to:
receive an access attempt by a client device to a cloud-based application hosted in the cloud-computing platform;
identify login information corresponding to the identified access attempt;
request authenticated login information from a central authentication system;
correlate the received login information corresponding to the identified access attempt with the requested authenticated login information provided by the central authentication system;
determine, based on the correlation, whether an authentication bypass vulnerability exits, wherein the authentication bypass vulnerability exists when the received login information is uncorrelated with requested authenticated login information; and
generate a bypass event when it is determined that the bypass vulnerability hac, exists, wherein the bypass event indicates that the access attempt to the cloud-based application has not been properly authenticated.

25. The cloud computing platform of claim 24, wherein the central authentication deployed in the cloud computing platform, wherein the central authentication system is any of: a federated identity management (FIdM) system and a single-sign-on (SSO) server.

* * * * *